United States Patent
Thangavel et al.

(10) Patent No.: US 12,489,702 B1
(45) Date of Patent: Dec. 2, 2025

(54) ROUTE PREFERENCE BASED ON LINK PERFORMANCE

(71) Applicant: Juniper Networks, Inc., Sunnyvale, CA (US)

(72) Inventors: Mohan Thangavel, Bangalore (IN); Saurav Shaw, Bangalore (IN); Vijay Sai Ram Paruchuri, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 146 days.

(21) Appl. No.: 18/350,470

(22) Filed: Jul. 11, 2023

(51) Int. Cl.
*H04L 45/125* (2022.01)
*H04L 45/12* (2022.01)

(52) U.S. Cl.
CPC .......... *H04L 45/125* (2013.01); *H04L 45/123* (2013.01); *H04L 45/124* (2013.01)

(58) Field of Classification Search
CPC ... H04L 45/125; H04L 45/123; H04L 45/124; H04L 45/302; H04L 45/22; H04L 45/64; H04L 45/70; H04L 45/00; H04W 28/0268
USPC ........................................................ 709/238
See application file for complete search history.

(56) References Cited

U.S. PATENT DOCUMENTS

| | | | | |
|---|---|---|---|---|
| 7,586,899 B1* | 9/2009 | Mohaban | ................ | H04L 45/22 370/395.5 |
| 10,708,144 B2 | 7/2020 | Mohan et al. | | |
| 11,425,034 B1* | 8/2022 | Boopathy | ................ | H04L 45/42 |
| 11,637,753 B1 | 4/2023 | Wang et al. | | |
| 2009/0310509 A1* | 12/2009 | Kumai | ................ | H04W 48/18 370/254 |
| 2016/0191304 A1* | 6/2016 | Muller | ................ | H04L 45/586 370/220 |
| 2019/0334820 A1* | 10/2019 | Zhao | ................ | H04L 45/70 |
| 2023/0012609 A1 | 1/2023 | Wang et al. | | |
| 2023/0107735 A1 | 4/2023 | Wang et al. | | |
| 2024/0039806 A1* | 2/2024 | Singwi | ................ | G06F 11/0754 |

(Continued)

FOREIGN PATENT DOCUMENTS

WO 2013184846 A1 12/2013

OTHER PUBLICATIONS

D. Suh et al., "Toward Highly Available and Scalable Software Defined Networks for Service Providers," in IEEE Communications Magazine, vol. 55, No. 4, pp. 100-107, Apr. 2017 (Year: 2017).*

(Continued)

*Primary Examiner* — Taylor A Elfervig
(74) *Attorney, Agent, or Firm* — Shumaker & Sieffert, P.A.

(57) ABSTRACT

Techniques are disclosed for computing a priority of routes advertised by nodes implementing Layer-3 (L3) Multi-Node High Availability (MNHA) for a Software-Defined Wide Area Network (SD-WAN) interconnecting a first network device and a second network device according to link adherence to performance requirements. In one example, a node computes a priority for a route to the second network device based at least in part on a comparison between (1) one or more performance measurements of a link between the node and the second network device and (2) one or more performance requirements for the link. In some examples, the computed priority for the route is further based in part on a preference for the node. The node exports, to the first network device, the route to the second network device, wherein the route comprises data specifying the computed priority for the route.

18 Claims, 8 Drawing Sheets

(56) References Cited

U.S. PATENT DOCUMENTS

2024/0106739 A1* 3/2024 Rajagopalan ......... H04L 45/306
2024/0305564 A1* 9/2024 Thoria ................... H04L 45/22

OTHER PUBLICATIONS

Z. Wen, Y. Liang and G. Li, "Design and Implementation of High-availability PaaS Platform Based on Virtualization Platform," 2020 IEEE 5th Information Technology and Mechatronics Engineering Conference (ITOEC), Chongqing, China, 2020, pp. 1571-1575, (Year: 2020).*

"FortiNAC—High Availability", 2023, fortinet.com, document library, p. 1-64 (Year: 2023).*

I. M. Suartana, M. A. N. Anggraini and A. Z. Pramudita, "High Availability in Software-Defined Networking using Cluster Controller: A Simulation Approach," 2020 Third International Conference on Vocational Education and Electrical Engineering (ICVEE), Surabaya, Indonesia, 2020, pp. 1-5 (Year: 2020).*

Assaf Muller, "Layer 3 High Availability", assafmuller.com, OperStack, p. 1-13, 2014 (Year: 2014).*

V. Pashkov and R. Smeliansky, "On High Availability Distributed Control Plane for Software-Defined Networks," 2018 International Scientific and Technical Conference Modern Computer Network Technologies (MoNeTeC), Moscow, Russia, 2018, pp. 1-10 (Year: 2018).*

P. Segeč, M. Moravčik, J. Uratmová, J. Papán and O. Yeremenko, "SD-WAN—architecture, functions and benefits," 2020 18th International Conference on Emerging eLearning Technologies and Applications (ICETA), Koice, Slovenia, 2020, pp. 593-599, (Year: 2020).*

Juniper, "IPsec VPN Support in Multinode High Availability," Junos OS High Availability User Guide, Jan. 2, 2023, 6 pp.

Juniper, "Multinode High Availability Services," Junos OS High Availability User Guide, Dec. 15, 2022, 4 pp.

Juniper, "Multinode High Availability," Junos OS High Availability User Guide, May 12, 2023, 33 pp.

Juniper, "Prepare Your Environment for Multinode High Availability Deployment," Junos OS High Availability User Guide, Mar. 9, 2023, 4 pp.

* cited by examiner

ROUTE PREFERENCE BASED ON LINK PERFORMANCE

TECHNICAL FIELD

The disclosure relates generally to computer networks.

BACKGROUND

Over the last few decades, the Internet has grown exponentially from a small network comprising of a few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VOIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, this disclosure describes one or more techniques for computing a priority of a route based at least in part on an adherence to one or more performance requirements of a link for the route. In one example, a Software-Defined Wide Area Network (SD-WAN) provides Layer-3 (L3) interconnectivity between a first network device and a second network device. Typically, the first and second network devices operate as customer-edge devices for, e.g., a customer Layer-2 (L2) network and provide access to the SD-WAN. In some examples, the SD-WAN includes a plurality of nodes that implement Multi-Node High Availability (MNHA) so as to provide high availability (HA) connectivity across the SD-WAN.

In accordance with the techniques of the disclosure, each node of the plurality of nodes implementing MNHA for an SD-WAN computes a priority of a route to the second network device based at least on performance requirements for a link between the respective node and the second network device. For example, a node obtains performance measurements for the corresponding link to the second network device. The node compares the performance measurements with performance requirements for the link, such as Service-level Agreement (SLA) requirements, and computes a priority of a route to the second network device based at least in part on the comparison. Optionally, the computed priority for the route is further based in part on a preference for the node as compared to others of the plurality of nodes. The node exports, to the first network device, the route to the second network device, wherein the route comprises data specifying the computed priority for the route.

The techniques of the disclosure may provide specific improvements to the computer-related field of computer networking that have practical applications. For example, the techniques of the disclosure may enable a node to advertise a route to a destination having a priority that is based at least in part on compliance with performance requirements, such as SLA requirements. Thus, the techniques of the disclosure may enable a network device to select a route for forwarding traffic that complies (or is most likely to comply) with performance requirements for the traffic. This may improve the performance of routing and forwarding of network traffic within a network, such as an SD-WAN, reduce congestion of network traffic within the network, and improve the network's ability to comply with performance requirements for different types of traffic. In addition, the techniques of the disclosure may improve the performance of a network implementing MNHA and reduce the consumption of resources within such a network implementing MNHA. For example, the techniques of the disclosure may obviate the need to exchange database updates between nodes implementing MNHA across Inter-chassis Links (ICLs) to share performance information of the nodes, which may otherwise consume an undesirable amount of network resources and impact the forwarding of data traffic within the network.

In one example, the disclosure is directed to a computing system comprising processing circuitry having access to a memory, the processing circuitry configured to: execute a node of a plurality of nodes connected to a first network device via an access network, the plurality of nodes implementing Layer-3 (L3) Multi-Node High Availability (MNHA) for a Software-Defined Wide Area Network (SD-WAN) interconnecting the plurality of nodes with a second network device, wherein the node is configured to: compute a priority for a route to the second network device based at least in part on a comparison between one or more performance measurements of a link between the node and the second network device and one or more performance requirements for the link; and export, to the first network device, the route to the second network device, wherein the route comprises data specifying the priority for the route.

In another example, the disclosure is directed to a method comprising: computing, by a node of a plurality of nodes connected to a first network device via an access network, the plurality of nodes implementing Layer-3 (L3) Multi-Node High Availability (MNHA) for a Software-Defined Wide Area Network (SD-WAN) interconnecting the plurality of nodes with a second network device, a priority for a route to the second network device based at least in part on a comparison between one or more performance measurements of a link between the node and the second network device and one or more performance requirements for the link; and exporting, by the node and to the first network device, the route to the second network device, wherein the route comprises data specifying the priority for the route.

In another example, the disclosure is directed to a non-transitory, computer-readable medium comprising instructions, that, when executed, are configured to cause processing circuitry of a computing system to: execute a node of a plurality of nodes connected to a first network device via an access network, the plurality of nodes implementing Layer-3 (L3) Multi-Node High Availability (MNHA) for a Software-Defined Wide Area Network (SD-WAN) interconnecting the plurality of nodes with a second network device, wherein the node is configured to: compute a priority for a route to the second network device based at least in part on a comparison between one or more performance measurements of a link that is between the node and the second network device and one or more performance requirements for the link; and export, to the first network device, the route to the second network device, wherein the route comprises data specifying the priority for the route.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
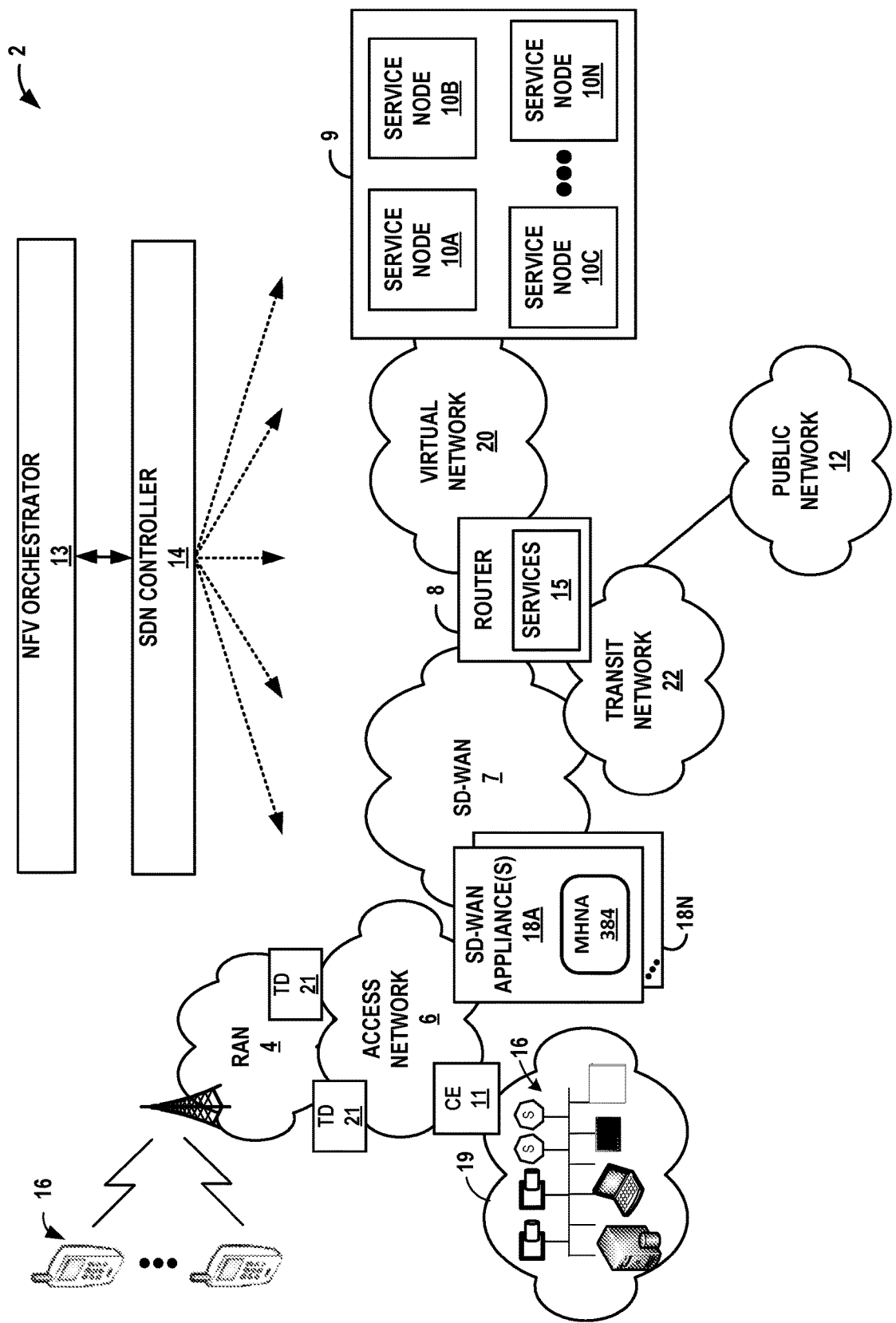
FIG. 1 is a block diagram illustrating an example service provider network implementing MNHA for an SD-WAN that uses performance metrics associated with respective links of the SD-WAN to compute costs of routes to respective MNHA nodes, in accordance with the techniques of the disclosure.

In the current competitive world, network redundancy plays a key role for continuity of business. Any downtime may impact the business operation model. A plurality of network devices in an L3 SD-WAN may implement MNHA to achieve high availability while providing both increased redundancy and efficiency, improving convergence, and providing scalability across multiple geographical location, as well as supporting a theoretical N number of nodes implementing the MNHA configuration. As described herein, the participating devices implementing MNHA may be co-located or physically separated across geographical areas or other locations such as different rooms or buildings. Typically, having nodes with high availability across geographical locations ensures resilient service. If a disaster affects one physical location, the MNHA system may fail network traffic over to a node in another physical location, thereby ensuring continuity. An MNHA system as described may depend on external routing, and may require an administrator to set up upstream and downstream network devices to converge routes faster upon failure of a particular node of the MNHA system.

A system implementing MNHA may support a number N of nodes, and each of the nodes operates independently. However, a conventional system implementing MNHA may hinder the operation of an SD-WAN. This is because the SD-WAN calculates a best path across all the nodes within the SD-WAN and steers traffic accordingly. The nodes of a conventional MNHA system are independent and do not synchronize SLA database state, probe counters, or best path information with each other to achieve an SD-WAN implementation. Because there theoretically is no limitation of the number of nodes within an MNHA implementation, the computation of routes may be challenging within an SD-WAN with large numbers of nodes.

Because there is no limit of number of nodes within a conventional MNHA system, and because the nodes may geographically exist in different location, the complexities of using ICLs to synchronize all the required information for SD-WAN are further increased. Because the ICL link is built using a revenue port of a node (e.g., the port of the node used to exchange customer data traffic), these continuous SLA DB state updates used to synchronize information for the SD-WAN consume a significant amount of bandwidth, and so the volume of customer traffic exchanged through the revenue port must be reduced so as to allocate bandwidth for successful SLA DB state synchronization across the nodes. In addition, a conventional MNHA system should ensure the reliability and availability of the SLA DB state synchronizations across the nodes, because any delay in synchronization may disrupt the performance of user application traffic and negatively impact the user experience.

A conventional MNHA system should handle ICL failovers properly so as to provide high availability of SLA DB state synchronization based on ICL link status. However, when a node violates SLA, a conventional MNHA system may attempt to redirect traffic through another active best node via ICL, which may further choke the ICL link.

Additionally, in MNHA, only routes play a key role to converge traffic faster. Whenever a route goes down, a conventional MNHA system may steer traffic to a next available route, irrespective of the existence of a healthier link which may be available between the existing nodes. Traffic may be impacted in terms of jitter, latency, and packet-loss in a current active high-preference link. Therefore, impact on existing traffic within a conventional MNHA system may not be avoidable unless there is a route change.

In an MNHA system, a Local Area Network (LAN)-side node (typically, an L3 switch) sends traffic to a specific HA node based on a route priority learned via a routing protocol, such as Border Gateway Protocol (BGP). At the HA node, the overlays to respective Hub/Site locations are configured using a public Wide Area Network (WAN). The LAN-side node may not be aware of the current status of the HA node with respect to the WAN overlay, e.g., whether or not the HA node is actually satisfying SLA requirements to achieve an SD-WAN implementation. As a result, the LAN-side node may steer traffic to a node which is relatively less healthy than other nodes or does not comply with SLA requirements. Therefore, implementing SD-WAN on a plurality of nodes configured for a conventional MNHA may be a challenge.

In accordance with the techniques of the disclosure, a node of a plurality of nodes implementing a L3 MNHA configuration within an SD-WAN uses performance metrics associated with a link of the SD-WAN to compute a cost of a route to the node. In a conventional system, route convergence may be based on route failure only. Further, the nodes implementing MNHA may not be synchronized in terms of application database state, SLA path awareness, etc. A system as described herein may use the intelligence gained from individual HA nodes to perform route convergence based on SLA requirements for traffic associated with a specific application, thereby providing SD-WAN functionality on top of MNHA. In addition, a system using the techniques described herein may not need to synchronize any SLA DB state across the nodes implementing MNHA, which may substantially solve the aforementioned limitations of conventional MNHA implementations.

Conventionally, the health of an HA node with respect to meeting SLA requirements is not known to the LAN-side node. As described herein, the HA node may adjust the route priority of an advertised route dynamically based on adherence to SLA factors, thereby causing the LAN node to switch network traffic to a best-suited HA node at a given moment.

The HA nodes may continuously monitor adherence of respective overlay paths to SLA requirements using probes.

If one or more SLA requirements are violated, the routing control plane is informed about the same. The corresponding HA node may adjust a route preference value for an advertised route and communicate such adjusted route preference to the LAN-side node using a routing protocol control plane signaling mechanism.

FIG. 1 is a block diagram illustrating an example service provider network 2 implementing MNHA for SD-WAN 7 that uses performance metrics associated with respective links of SD-WAN 7 to compute costs of routes to respective MNHA nodes provided by SD-WAN appliances 18A-18N (hereinafter, SD-WAN appliances 18), in accordance with the techniques of the disclosure.

The example network system of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

In the example of FIG. 1, service provider network 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VOIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, an L3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or datacenter 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions for a subscriber network 19. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IT) devices, such as cameras, sensors(S), televisions, appliances, etc. In addition, subscriber devices 16 may comprise mobile devices that access the data services of service provider network 2 via a radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the 3rd Generation Partnership Project (3GPP), 3rd Generation Partnership Project 2 (3GGP/2) and the WiMAX forum.

SD-WAN appliances 18 may be one or more customer edge (CE) routers, provider edge (PE) routers, or other network devices between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliances 18 or router 8. In turn, SD-WAN appliances 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliances 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 8. In addition, or alternatively, service provider network 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliances 18 has authenticated and established access sessions for the subscribers, SD-WAN appliances 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliances 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, service provider network 2 comprises a software defined network (SDN) and network functions virtualization (NFV) architecture. SDN controller device 14 may provide a high-level controller for configuring and managing the routing and switching infrastructure of service provider network 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within network system 2, such as SD-WAN appliances 18, perform application data monitoring using various application quality of experience (QoE) metric functions, such as real-time performance monitoring (RPM) or two-way active measurement protocol (TWAMP), for example. That is, RPM and TWAMP may be used within service provider network 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions and exchange test packets for the data sessions. In the example network architecture illustrated in FIG. 1, SD-WAN appliances 18 are configured to perform the QoE metric predictions, as well as a dynamic path selection algorithm. SD-WAN appliance 18 allow for load sharing across connections and adjusts traffic flows based on network conditions to improve performance.

SD-WAN appliances 18, which perform the dynamic path selection algorithms, may determine QoE metrics, such as service level agreement (SLA) parameters that include round-trip time (RTT), jitter, and packet loss, which were influenced by applications' real-time parameters like packet size, queues and burst of packets to determine the best path.

Business continuity is an important requirement of the modern network. Downtime of even a few seconds might cause disruption and inconvenience apart from affecting Operational Expenditure (OpEx) and Capital Expenditure (CapEx). Modern networks also have data centers spread across multiple geographical areas. In such scenarios, achieving high availability can be very challenging.

SD-WAN appliances 18 implement MHNA module 384. Network devices implementing Multinode High Availability (MNHA), such as those offered by Juniper Networks, Inc., address high availability requirements for modern data centers. In MNHA, both the control plane and the data plane of the participating devices (nodes) are active at the same time. Thus, the solution provides inter-chassis resiliency. MNHA may provide numerous benefits, such as reduced CapEx and OpEx, by eliminating the need for a switched network surrounding the firewall complex and the need for a direct L2 connectivity between nodes, increased network flexibility by providing greater network flexibility by supporting high availability across L3 and switched network segments, stateful resiliency, by supporting active control plane and data plane at the same time on both nodes, business continuity and disaster recovery, by maximizing availability, increasing redundancy within and across data centers and geographies, smooth upgrades, by supporting different versions of operating systems on two nodes to ensure smooth upgrades between releases, and to run two different versions of an operating system.

Participating devices may be co-located within the same chassis or physically separated across geographical areas or other locations such as different rooms or buildings. Having nodes with high availability across geographical locations ensures resilient service. If a disaster affects one physical location, MNHA can fail over to a node in another physical location, thereby ensuring continuity.

MNHA may support active/backup mode or active/active mode with support of multiple services redundancy groups (SRGs). Nodes implementing MNHA may support firewall and advanced security services, such as application security, unified threat management (UTM), intrusion prevention system (IPS), firewall user authentication, NAT, ALG.

Typically, to deploy MNHA, two or more network devices, such as SD-WAN appliances 18, present themselves as independent nodes to the rest of network 2. The nodes are connected to adjacent infrastructure belonging to the same or different networks, all depending on the deployment mode. The nodes are connected to adjacent infrastructure belonging to different networks, such as access network 6. These nodes can either be collocated or separated across geographies. Participating nodes back up each other to ensure a fast synchronized failover in case of system or hardware failure.

MNHA may be implemented according to the following types of network deployment models:

Route mode (all interfaces connected using an L3 topology).
  Default gateway mode (all interfaces connected using an L2 topology) used in more traditional environments. Common deployment of DMZ networks where the firewall devices act as the default gateway for the hosts and applications on the same segment.
  Hybrid mode (one or more interfaces are connected using an L3 topology and one or more interfaces are connected using an L2 topology).
  Deployment within a cloud service provider environment.

MNHA is different from a chassis cluster. A chassis cluster operates in L2 network environment and requires two links between the nodes (control link and fabric link). These links connect both nodes over dedicated VLANs using back-to-back cabling or over dark fiber. Control links and fabric links use dedicated physical ports on the SRX Series device.

In contrast to a chassis cluster, a MNHA implementation uses an encrypted logical ICL. The ICL connects the nodes over a routed path instead of a dedicated L2 network. This routed path can use one or more revenue ports for best resiliency, and may dedicate its own routing instance to these ports and paths to ensure total isolation which maximizes the resiliency of the solution.

In an MNHA setup, two or more network devices, such as SD-WAN appliances 18, are connected to adjacent upstream and downstream routers (for Layer 3 deployments), routers and switches (hybrid deployment), or switches (default gateway deployment) using the revenue interfaces. Each of SD-WAN appliances 18 may comprise one or more nodes that implement MNHA and are connected to access network 6 and SD-WAN 7.

The nodes of SD-WAN appliances 18 communicate with each other using an ICL. The ICL link uses L3 connectivity to communicate with each other node. This communication can take place over a routed network (L3), or a directly connected L2 path. The ICL is typically bound to the loopback interface and has more than one physical link (LAG/LACP) to ensure path diversity for the highest resiliency.

MNHA operates in active/active mode for data plane services and active/backup mode for control plane services. In a typical default gateway deployment, hosts and servers in a LAN are configured with a default gateway of a security device. The security device hosts a virtual IP (VIP) address that moves between nodes based on the activeness. The configuration on hosts remains static, and security device failover is seamless from the hosts' perspective. The active device hosts a floating IP address and steers traffic towards it using the floating IP address.

A services redundancy group (SRG) is a failover unit in an MNHA setup. There are two types of SRGs: SRG0 and SRG1+. The SRG0 manages security service from Layer 4-Layer 7 except IPsec VPN services. The SRG0 operates in active mode on both nodes at any point in time. On SRG0, each security session traverses the node in a symmetric flow. Further, backup of these flows are fully state-synchronized to the other node. The SRG1+manages IPsec services and virtual IPs for hybrid and default gateway mode and are backed up to the other node. The SRG1 operates in active mode on one node and in backup node on another node.

Floating IP addresses controlled by an SRG moves between the nodes of the SRG. An Active SRG1+hosts and controls the floating IP address. In failover scenarios, this IP address 'floats' to another active SRG1 based on configuration, system health, or path monitoring decisions. The newly active SRG1+can take on the function of a now-standby SRG1 and starts responding to incoming requests.

In this topology, two nodes of SD-WAN appliances 18 are part of an MNHA setup. The setup has Layer 3 connectivity between the nodes and neighboring network devices. SD-WAN appliances 18 are running on separate physical L3 networks and are operating as independent nodes. The nodes nay be co-located in the topology or geographically separated.

In an MNHA setup, activeness is determined at the service level, not at the node level. The active/backup state is at the SRG level and the traffic is steered toward the active SRG. SRG0 remains active on both the nodes, whereas SRG1 can remain in active or in backup state in each node. In an MNHA setup, both nodes initially advertise a route for the floating IP address to the upstream routers. There may not be a specific preference between the two paths advertised by the nodes. However, the receiving network device, e.g., CE 11, may have its own preferences on one of the paths depending on the configured metrics.

Conventionally, on boot, the nodes enter a hold state and start probing continuously. The nodes use the floating IP address (activeness-probing source IP address) as a source IP address and IP addresses of the upstream network devices (e.g., router 8) as the destination IP address for the activeness determination probe.

Router 8, hosting the probe destination IP address, replies to the node that is available on its preferred routing path. In the following example, SD-WAN appliance 18A receives the response from the upstream router.

SD-WAN appliance 18A promotes itself to the active role since it received the probe reply. SD-WAN appliance 18A communicates its role change to the nodes (e.g., SD-WAN appliances 18B-18B) and takes up the active role. After the activeness is determined, the active node, SD-WAN appliance 18A, hosts the floating IP address assigned to it, advertises the high-preference path to adjacent BGP neighbors (e.g., CE 11), continues to advertise the active (higher) preference path for all remote and local routes to draw the traffic, and notifies the active node status to the other nodes (e.g., SD-WAN appliances 18B-18N) through the ICL.

The other nodes, e.g., SD-WAN appliances 18B-18N, stop probing and take over the backup role. The backup nodes advertise the default (lower) priority, ensuring that the upstream router, e.g., CE 11, does not forward any packets to the backup node.

Multinode High Availability 384 adds active and backup signal routes for the SRG to the routing table when the node moves to the active role. In case of node failures, the ICL goes down and the current active node releases its active role and removes the active signal route. Now the backup node detects the condition through its probes and transitions to the active role. The route preference is swapped to drive all the traffic towards the new active node.

The MNHA solution supports redundancy at the service level. Service-level redundancy minimizes the effort needed to synchronize the control plane across the nodes.

After the MNHA setup determines activeness, it negotiates subsequent high availability (HA) state through the ICL. A backup node, e.g., SD-WAN appliance 18N, sends ICMP probes using the floating IP address. If the ICL is up, the node receives a response to its probe and remains as the backup node. If the ICL is down, and there are no probe response, the backup node transitions into the active node.

The SRG1 of the previous backup node now transitions to the active state and continues to operate seamlessly. When the transition happens, the floating IP address is assigned to the active SRG1. In this way, the IP address floats between the active and backup nodes and remains reachable to all the connected hosts. Thus, traffic continues to flow without any disruption. Services, such as IPsec VPN, that require both control plane and data plane states are synchronized across the nodes. Whenever an active node fails for this service function, both control plane and data plane fail over to the backup node at the same time.

SD-WAN appliances 18 implementing one or more nodes of MNHA may provide a high availability failure detection that monitors both system, software, and hardware for internal failures. The system can also monitor network connectivity problems or link connectivity using an interface monitoring service, a BFD path monitoring service, and an IP monitoring service to detect reachability of targets further away.

For example, the BFD monitoring service monitors reachability to the next hop by examining the link layer along with the actual link. The BFD monitoring service may be used to detect path failures and link failures. The BFD monitoring service may detect failure within its routing connectivity, but typically may not detect failures beyond direct connections/next-hops.

The IP monitoring service monitors the connectivity to hosts or services located beyond directly connected interfaces or next-hops. The IP monitoring service may be used to detect path failures and link failures. The IP monitoring service may detect failure occurring at more distant hosts or services, but typically may not detect failures occurring in directly connected links or next-hop failures.

The interface monitoring service examines whether the link layer is operational or not. The interface monitoring service may be used to detect link failures. The interface monitoring service may detect failure in directly connected links or next-hops, and connectivity to hosts or services located farther away, but typically is not used to monitor an entire path to a destination.

In MNHA, when monitoring services detect a connectivity failure to a host or service, it marks the affected path as down/unavailable, and marks the corresponding SRG at the impacted node as Ineligible. The affected SRGs will transition in a stateful manner to the other node without causing any disruption to traffic. To prevent any traffic from being lost, when operating in L3 mode, MNHA withdraws routes so that the traffic is redirected correctly, and when operating in default gateway or hybrid mode, the new active node for the SRG sends a GARP (Gratuitous ARP) to the connected switch to ensure the re-routing of traffic.

Additional discussion of MNHA is provided by "Multinode High Availability," High Availability User Guide, Junos OS, Juniper Networks, Inc., available at https://www.juniper.net/documentation/us/en/software/junos/high-availability/topics/topic-map/mnha-introduction.html (accessed on Jun. 14, 2023); "Prepare Your Environment for Multinode High Availability Deployment," High Availability User Guide, Junos OS, Juniper Networks, Inc., available at https://www.juniper.net/documentation/us/en/software/junos/high-availability/topics/concept/mnha-preparation.html (accessed on Jun. 14, 2023); "Multinode High Availability Services," High Availability User Guide, Junos OS, Juniper Networks, Inc., available at https://www.juniper.net/documentation/us/en/software/junos/high-availability/topics/concept/mnha-services.html (accessed on Jun. 14, 2023); and "IPsec VPN Support in Multinode High Availability," High Availability User Guide, Junos OS, Juniper Networks, Inc., available at https://www.juniper.net/documentation/us/en/software/junos/high-availability/topics/concept/mnha-ipsec-vpn.html (accessed on Jun. 14, 2023), the entire content of each of which is incorporated herein by reference.

Conventionally, a node within an MNHA system synchronizes state with each other node of the MNHA system via ICLs between respective nodes. For example, the nodes may synchronize HA state so as to determine MNHA roles of each node. Further, the nodes may synchronize SLA DB state with one another. By communicating SLA DB state, the nodes may learn which nodes adhere to one or more SLA requirements which specify one or more performance for, e.g., different network services, different applications, different customers, etc. The synchronization of SLA DB state between nodes of a conventional MNHA system consumes a significant amount of network resources that may otherwise be used for exchanging customer data traffic. Furthermore, as the number of nodes within a conventional MNHA system increases, the amount of SLA DB state synchronizations between nodes increases, thereby increasing the complexity of implementing an SD-WAN with the nodes of the MNHA system.

In accordance with the techniques of the disclosure, a node implementing MNHA, such as one of SD-WAN appliances 18, may compute a priority of a route advertised for the node based at least in part on an adherence to one or more performance requirements of a link for the route. As depicted in the example of FIG. 1, SD-WAN appliances 18 are connected to CE 11 via access network 6, and SD-WAN 7 provides L3 interconnectivity between SD-WAN appliances 18 and router 8. In some examples, SD-WAN appliances 18 execute a plurality of nodes that implement MNHA so as to provide high availability connectivity across SD-WAN 7.

In accordance with the techniques of the disclosure, each of the nodes of SD-WAN appliances 18 implementing MNHA compute a priority of a route from the node to router 8 based at least on performance requirements for a link between the respective node and the router 8. For example, a node of SD-WAN appliance 18A obtains performance measurements for the corresponding link between SD-WAN appliance 18A and router 8. The node of SD-WAN appliance 18A compares the performance measurements of the link with performance requirements for the link, such as SLA requirements. The node of SD-WAN appliance 18A computes a priority of a route to router 8 based at least in part on the comparison. Optionally, the node of SD-WAN appliance 18A further bases the computed priority for the route at least in part on a preference for the node as compared to others of the plurality of nodes implementing MNHA for SD-WAN 7. The node of SD-WAN appliance 18A exports, to CE 11, the route to router 8, wherein the route comprises data specifying the computed priority for the route.

CE 11 receives, from each of the nodes of SD-WAN appliance 18, routes computed in a similar manner. CE 11 may use conventional techniques to select a route with a least cost for forwarding network traffic of subscriber devices 19 to router 8. In this fashion, each of the nodes of SD-WAN appliance 18 may compute a cost of an advertised route to router 9 based at least in part on an adherence to one or more performance requirements of a respective link connecting the node to router 9. Thus, CE 11, in selecting a least-cost route to router 8, is elicited to select the route corresponding to a link that satisfies (or most closely satisfies) performance requirements for the link.

Figure 2:
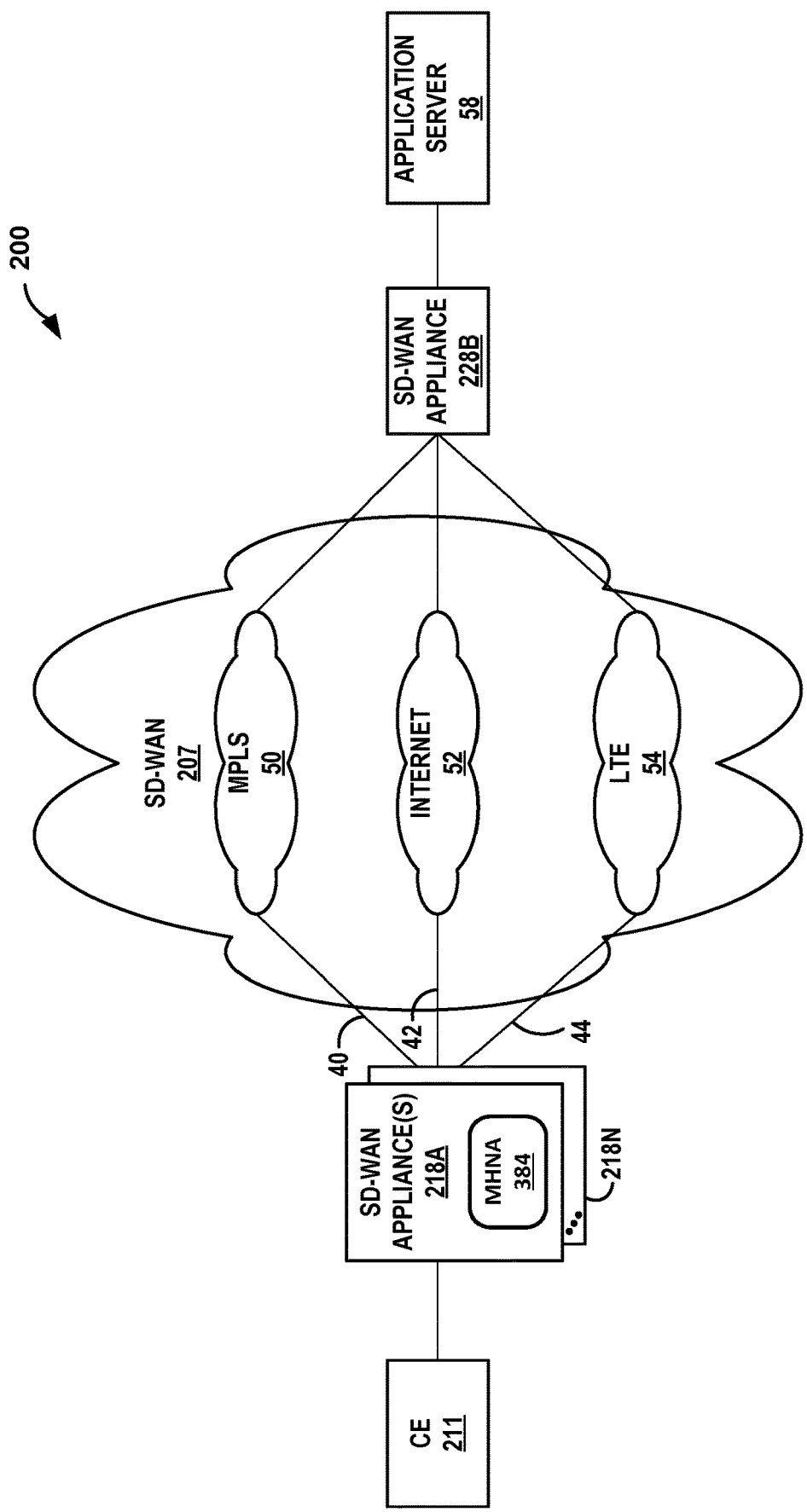
FIG. 2 is a block diagram illustrating an example system implementing MNHA for an SD-WAN, in accordance with one or more techniques of this disclosure.

FIG. 2 is a block diagram illustrating an example system 200 implementing MNHA for SD-WAN 207, in accordance with one or more techniques of this disclosure. SD-WAN 207 may be an example of SD-WAN 7 of FIG. 1. In the example described herein, SD-WAN 207 includes three different WAN links: a first WAN link 40 coupling SD-WAN appliances 218A-218N (hereinafter, "SD-WAN appliances 218") to a Multi-Protocol Layer Switching (MPLS) network 50, a second WAN link 42 coupling SD-WAN appliance 218A to Internet 52, and a third WAN link 44 coupling SD-WAN appliance 218A to long-term evolution (LTE) network 54. In the example of FIG. 2, each of SD-WAN appliances 218 is a computing device that executes one or more nodes of a plurality of nodes implementing MHNA for SD-WAN 207.

In other examples, SD-WAN 207 may include any number of links of any suitable type for transmitting data flows between the client side (e.g., CE 211 and SD-WAN appliance 218A) and the application side (e.g., SD-WAN appliance 228 and application server 58). CE 211 may be an example of client device 11 of FIG. 1. SD-WAN appliances 218 and 228 may be examples of SD-WAN appliances 18 and router 8 of FIG. 1, respectively.

Application server 58 may execute one or more services 15 of FIG. 1. For example, services 15 executed by application servers 58 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic of CE 211.

SD-WAN appliance 218A may periodically send probe packets of various sizes to each of the potential WAN links 40, 42, and 44 in order to keep up-to-date records of the metrics for WAN links 40, 42, and 44 such that the data flow may be routed swiftly upon receipt. Additional description with respect to an SD-WAN may be found, e.g., in U.S. Pat. No. 10,708,144, entitled "PREDICTING APPLICATION QUALITY OF EXPERIENCE METRICS USING ADAPTIVE MACHINE LEARNED PROBES," issued on Jul. 7, 2020; U.S. Pat. App. Pub. No. 2023/0012609, entitled "ADAPTABLE SOFTWARE DEFINED WIDE AREA NETWORK APPLICATION-SPECIFIC PROBING," published on Jan. 19, 2023; U.S. Pat. App. Pub. No. 2023/0107735, entitled "AI-ASSISTED WAN LINK SELECTION FOR SD-WAN SERVICES," published on Apr. 6, 2023; and U.S. Pat. No. 11,637,753, entitled "ADAPTIVE LOCATION-BASED SD-WAN POLICIES," issued on Apr. 25, 2023, the entire contents of each of which is incorporated by reference herein.

In accordance with the techniques of the disclosure, SD-WAN appliance 218A executes one or more nodes implementing MNHA. Each node computes a priority of a route from the node to SD-WAN appliance 228 based at least on performance requirements for a link between the respective node and SD-WAN appliance 228.

For example, a first node of SD-WAN appliance 218A obtains performance measurements for link 40 and compares the performance measurements of link 40 with performance requirements for link 40, such as SLA requirements. The first node computes a priority for a route to SD-WAN appliance 228 via link 40 based at least in part on the comparison. Optionally, the first node further bases the computed priority for the route at least in part on a preference for the node as compared to other nodes implementing MNHA for SD-WAN 207. The first node exports, to CE 211, the route via link 40 to SD-WAN appliance 228, wherein the route comprises data specifying the computed priority for the route.

In a similar fashion, a second and third node of SD-WAN appliance 218A obtain performance measurements for links 42 and 44, respectively. The second and third nodes compare the performance measurements for links 42 and 44 with respective performance requirements for links 42 and 44. The second and third nodes compute priorities for routes to SD-WAN appliance 228 via respective links 42, 44 based at least in part on the comparison. Optionally, the second and third nodes further base the computed priorities for the routes at least in part on preference for the second and third nodes as compared to other nodes implementing MNHA for SD-WAN 207. The second and third nodes export, to CE 211, the routes via respective links 42, 44 to SD-WAN appliance 228, wherein the routes comprise data specifying the computed priority for the respective route.

Figure 3:
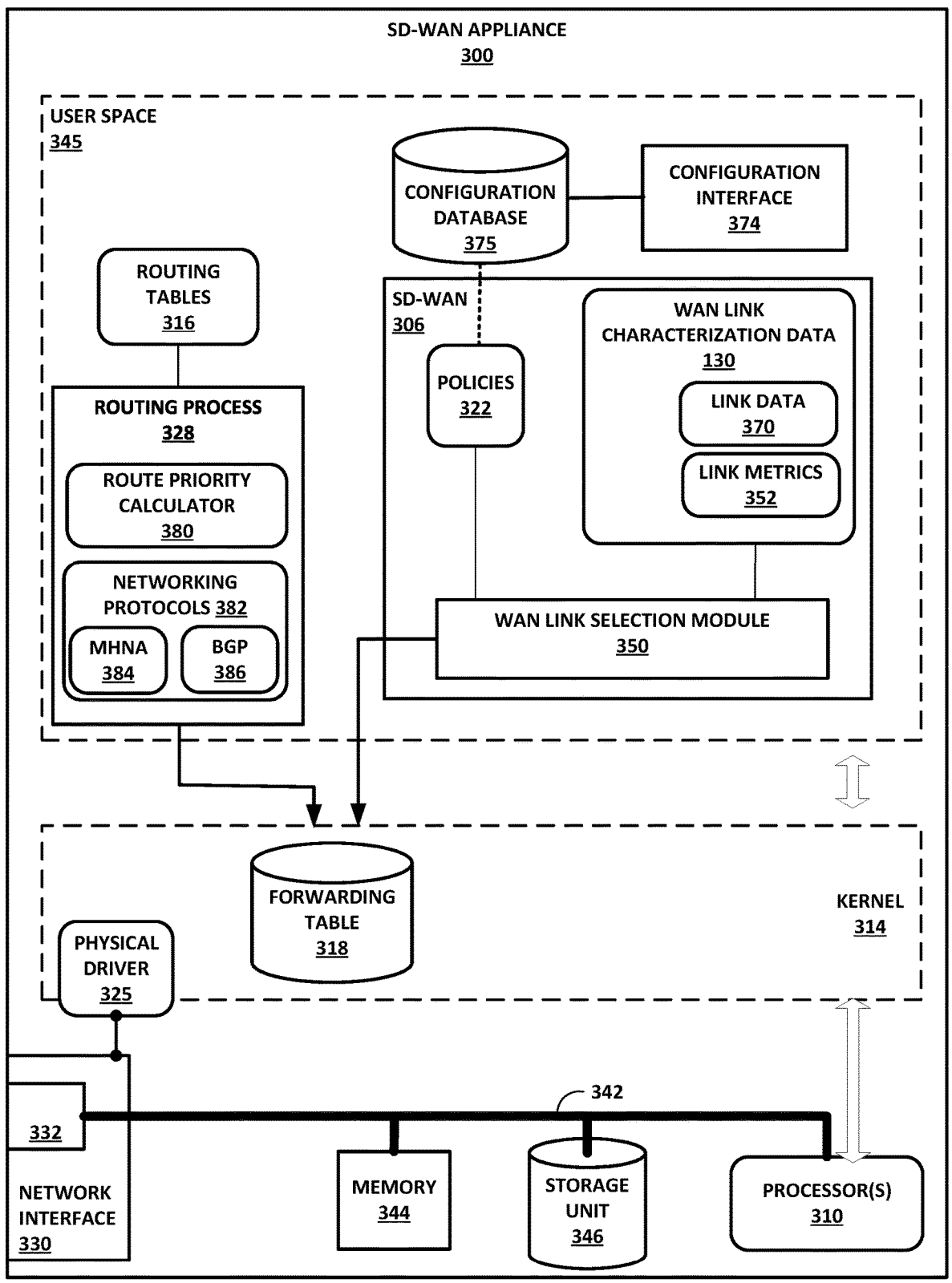
FIG. 3 is a block diagram illustrating an example SD-WAN appliance in further detail, according to techniques described in this disclosure.

FIG. 3 is a block diagram illustrating an example SD-WAN appliance 300 in further detail, according to techniques described in this disclosure. SD-WAN appliance 300 ("SD-WAN appliance 300") may represent any of SD-WAN appliances 18 of FIG. 1 or SD-WAN appliances 218 of FIG. 2. SD-WAN appliance 300 is a computing device and may represent a physical network function (PNF) or virtual network function (VNF). SD-WAN appliance 300 may include one or more real or virtual servers configured to execute one or more VNFs to perform operations of SD-WAN appliance, such as an SD-WAN edge, ingress, egress, or core device.

SD-WAN appliance 300 includes in this example, a bus 342 coupling hardware components of a hardware environment. Bus 342 couples network interface card (NIC) 330, storage unit 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Processor(s) 310 may include one or more processors each including an independent execution unit comprising processing circuitry to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Storage unit 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor(s) 310.

Memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory. Interfaces 332 may be interfaces for underlay connections of WAN links configured for SD-WAN application 306 between SD-WAN appliance 300 and one or more other SD-WAN edges.

Memory 344, NIC 330, storage unit 346, and processor(s) 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 that provides a software interface facilitating the use NIC 330 by kernel 314 and processes in user space 345.

The hardware environment and kernel 314 provide a user space 345 operating environment for SD-WAN appliance 300 applications, including routing process 328, configuration interface 374, and SD-WAN application 306. Configuration interface 374 enables SD-WAN controller 14 (FIG. 1)

or an operator to configure SD-WAN appliance 300. Configuration interface 374 may provide a NETCONF interface, Simple Network Management Protocol (SNMP), a command-line interface, a RESTful interface, Remote Procedure Calls, or other interface by which remote devices may configure SD-WAN appliance 300 with configuration information stored to configuration database 375. Configuration information may include, e.g., policies 322. Policies 322 may include SLA rules that partially define operation of WAN link switching module 350 for SD-WAN application 306, routes, and virtual routing and forwarding instances (VRFs) configured with interfaces for WAN links, interfaces configurations that specify link type (IP, MPLS, mobile, etc.), priority, maximum bandwidth, encapsulation information, type of overlay tunnel, and/or other link characteristics.

Routing process 328 executes routing protocols to exchange routing information (e.g., routes) with other network devices and uses the routing information collected in routing table(s) 316 to select the active route to each destination, which is the route used by SD-WAN appliance 300 to forward incoming packets to that destination. In some examples, routing process 328 execute software instructions to implement one or more control plane networking protocols 382. For example, networking protocols 382 may include one or more routing protocols, such as BGP 386 or Internet Group Management Protocol (IGMP), for exchanging routing information with other network devices and for updating routing tables 316. Networking protocols 382 may further include MNHA 384 for providing, with one or more nodes, high availability for SD-WAN 7 of FIG. 1. In some examples, networking protocols 382 may include additional protocols, such as Multiprotocol Label Switching (MPLS) protocol and/or other routing protocols, communication session protocols such as Transmission Control Protocol (TCP), User Datagram Protocol (UDP), Transport Layer Security (TLS), or Internet Control Message Protocol (ICMP), or performance measurement protocols, such as Bidirectional Forwarding Detection (BFD).

To route traffic from a source host to a destination host via SD-WAN appliance 300, SD-WAN appliance 300 learns the path that the packet is to take. These active routes are inserted into the forwarding table 318 of SD-WAN appliance 300 and used by the forwarding plane hardware for packet forwarding. For example, routing process 328 may generate forwarding table 318 in the form of a radix or other lookup tree to map packet information (e.g., header information having destination information and/or a label stack) to next hops and ultimately to interfaces 332 for output. In some examples, SD-WAN appliance 300 may have a physically bifurcated control plane and data plane in which a switching control card manages one or more packet forwarding line cards each having one or more high-speed packet processors.

SD-WAN appliance 300 executes SD-WAN application 306 to implement an SD-WAN service, such as SD-WAN service 7 of FIG. 1. SD-WAN application 306 causes SD-WAN appliance 300 to forward traffic based on application flows. SD-WAN application 306 may identify packets of different application flows packets using packet characteristics. Once an application is identified using initial packet(s), information for identifying traffic for application sessions may be stored in flow tables for faster processing. WAN link switching module 350 selects WAN links to assign applications according to routing information, policy information, performance data, and service characteristics of the WAN links for an SD-WAN service implemented by SD-WAN application 306. SD-WAN application 306 may program forwarding table 318 with selected WAN links for applications, flow table data, or other data for mapping application traffic to a selected WAN link. Although termed and described as an application, SD-WAN application 306 may represent one or more processes, scripts, utilities, libraries, or other programs for performing SD-WAN edge operations.

SD-WAN appliance 300 may be configured with policies 322 that may define criteria for WAN link selection. In some aspects, the criteria may be expressed as rules that determine how an application is assigned to a WAN link. SD-WAN appliance 300 may use the criteria to assign applications to WAN links. As an example, a high priority application may be assigned to a high priority link, while lesser priority applications may be assigned to lesser priority links.

SD-WAN appliance 300 may select a WAN link for an application based in part on available bandwidths on the WAN links for an SD-WAN service that are acceptable based on the SLA for the application. For example, SLA rules of policies 322 may be associated with one or more SLA metrics that determine the SLA for applications that match the SLA rule. SD-WAN appliance 300 can gather WAN link characterization data 130 such as link metrics 352 that indicate values of various performance metrics for each of the WAN links. WAN link characterization data 130 can include link data 370 that indicates bandwidth usage of each of the WAN links. SD-WAN application 306 can compute available bandwidth for each of the WAN links. To obtain link data 370 for computing bandwidth usage, SD-WAN application 306 may obtain statistics for interfaces 332, such as interface bandwidth usage statistics. WAN link switching module 350 further selects WAN links to assign applications according to available bandwidth for the WAN links.

In accordance with the techniques of the disclosure, routing process 328 executes a node for providing MNHA services for an SD-WAN. Route priority calculator 380 of routing process 328 computes a priority of a route from the node to another network device based at least on performance requirements for a link between the respective node and the other network device.

For example, SD-WAN appliance 300 operates as SD-WAN appliance 218A of FIG. 2. In this example, route priority calculator 380 obtains one or more performance measurements for links 40, 42, and 44 between SD-WAN appliance 300 and, e.g., SD-WAN appliance 228 of FIG. 2. These performance measurements may include, e.g., WAN link characterization data 130, such as link metrics 352 that indicate values of various performance metrics for each of the WAN links 40, 42, and 44 or link data 370 that indicates bandwidth usage of each of the WAN links 40, 42, and 44. In some examples, the performance measurements include one or more of jitter, RTT, latency, or packet loss for each of the WAN links 40, 42, and 44.

Route priority calculator 380 further obtains one or more performance requirements for each of the WAN links 40, 42, and 44. In some examples, the one or more performance requirements for each of the WAN links 40, 42, and 44 comprise one or more SLA requirements. The SLA requirements may specify requirements for one or more of jitter, RTT, latency, or packet loss for each of the WAN links 40, 42, and 44, such as a maximum permissible jitter, a maximum RTT, a maximum permissible latency, or a maximum permissible packet loss.

Route priority calculator 380 compares the performance measurements of links 40, 42, and 44 with the performance requirements for links 40, 42, and 44. Route priority calculator 380 computes, based at least in part on the comparison, a priority of respective routes to SD-WAN appliance 228 via each of links 40, 42, and 44.

In some examples, route priority calculator 380 compares a single performance measurement to a single performance requirement. In other examples, route priority calculator 380 compares a plurality of performance measurements to a plurality of performance requirements. For example, route priority calculator 380 computes a path score for a route based at least in part on a number of the plurality of performance measurements of the link that satisfy corresponding ones of the plurality of performance requirements for the link. Route priority calculator 380 selects, based at least in part on the computed path score, a priority for the route based on a respective path score computed for the route. In some examples, the path score is based on a number of different SLA requirements that are satisfied by the performance measurements of the link. For example, where there are three performance requirements (e.g., jitter, latency, and packet loss), route priority calculator 380 selects, in order of highest-priority to lowest-priority:

a first priority for the route in response to determining that a corresponding link satisfies each of the three performance requirements;
  a second priority for the route in response to determining that a corresponding link satisfies only two of the three performance requirements;
  a third priority for the route in response to determining that a corresponding link satisfies only one of the three performance requirements; and
  a fourth priority for the route in response to determining that a corresponding link does not satisfy any of the three performance requirements.

Optionally, route priority calculator 380 further bases the computed priority for the routes at least in part on a preference for the node as compared to others of the plurality of nodes implementing MNHA for SD-WAN 7. Routing process 328 exports, to CE 211 of FIG. 2, the routes to SD-WAN appliance 228, wherein each of the routes comprises data specifying the computed priority for the route.

As an example of the foregoing, route priority calculator 380 computes a first priority for a first route via link 40 to SD-WAN appliance 228 based at least in part on a determination that performance measurements of link 40 satisfy performance requirements for link 40. Routing process 328 exports, to CE 211 of FIG. 2, the first route to SD-WAN appliance 228 via link 40, wherein the first route comprises data indicating the computed priority for the first route as more preferred than other routes to SD-WAN appliance 228.

In addition, route priority calculator 380 computes a second priority for a second route via link 42 to SD-WAN appliance 228 based at least in part on a determination that performance measurements of link 42 do not satisfy performance requirements for link 42. Routing process 328 exports, to CE 211 of FIG. 2, the second route to SD-WAN appliance 228 via link 42, wherein the second route comprises data indicating the computed priority for the second route as less preferred than other routes to SD-WAN appliance 228.

In some examples, route priority calculator 380 periodically computes a priority of a route from each node to SD-WAN appliance 228 on a periodic basis, and routing process 328 exports the updated route to CE 211. In some examples, route priority calculator 380 periodically computes the priority of the route from each node to SD-WAN appliance 228 in response to a failure of a WAN link between one of the plurality of nodes implementing MNHA with SD-WAN appliance 228. Such link failure may occur on a link between a node executed by SD-WAN appliance 300 and a destination device, or on a link between a node executed by another SD-WAN appliance geographically separate from SD-WAN appliance 300. In some examples, route priority calculator 380 periodically computes the priority of the route from each node to SD-WAN appliance 228 in response to a load balancing operation to load balance network traffic from, e.g., CE 211 to SD-WAN appliance 228.

In some examples, the SLA requirements specify requirements for a specific application or network service, and may specify different requirements for various different applications and network services. For example, route priority calculator 380 obtains performance measurements of link 40 to SD-WAN appliance 228 of FIG. 2. Route priority calculator 380 further obtains one or more first performance requirements for link 42 with respect to a first application and one or more second performance requirements for link 42 with respect to a second application.

Route priority calculator 380 computes a first priority for a first route based at least in part on a determination that that the one or more performance measurements of link 42 satisfy the one or more first performance requirements for link 42 with respect to the first application. The first priority indicates the first route is more preferred than other routes to SD-WAN appliance 228 provided by other nodes for network traffic associated with the first application. Further, route priority calculator 380 computes a second priority for the route based at least in part on a determination that the one or more performance measurements of the link do not satisfy the one or more second performance requirements for the link with respect to the second application. The second priority indicates the second route is less preferred than other routes to SD-WAN appliance 228 provided by other nodes for network traffic associated with the second application. Routing process 328 exports, to CE 211, the first route comprises data indicating the computed first priority with respect to the first application and the second route comprising data indicating the computed second priority with respect to the second application.

FIGS. 4A-4D are block diagrams illustrating example systems implementing MNHA for an SD-WAN, in accordance with one or more techniques of this disclosure. The example systems of FIGS. 4A-4D may represent implementations of any of network 2 of FIG. 1 or system 200 of FIG. 2 in further detail.

Figure 4A:
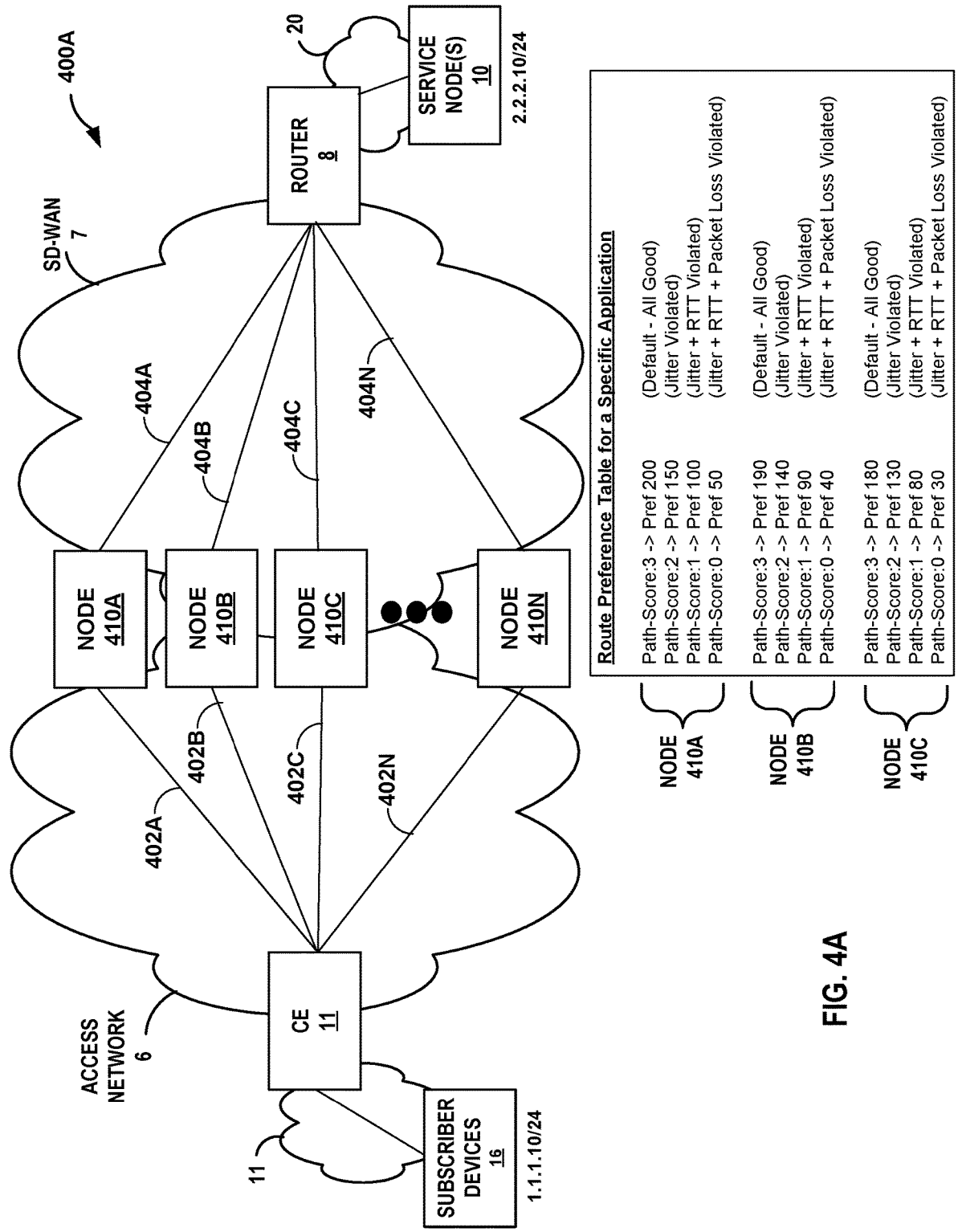
FIGS. 4A-4D are block diagrams illustrating example systems implementing MNHA for an SD-WAN, in accordance with one or more techniques of this disclosure.

FIG. 4A is a block diagram illustrating example system 400A implementing MNHA for an SD-WAN, in accordance with one or more techniques of this disclosure. System 400A includes a plurality of nodes 410A-410N (hereinafter, "nodes 410") connected to CE 11 via links 402A-402N (hereinafter, "links 402") of access network 6. Nodes 410 are further connected to router 8 via links 404A-404N (hereinafter, "links 404") of SD-WAN 7. Nodes 410 implement MNHA to provide high availability to SD-WAN 7. In typical L3 HA scenarios, theoretically the number of HA nodes 410 can be scaled as per customer requirements. Therefore, the techniques of the disclosure are not limited as per the number of nodes 410 providing HA.

Table 1 depicts route preferences for each node 410 ordered by adherence to individual elements of an SLA requirement for an application:

TABLE 1

Route preference table for a specific application.

| Node 410A | | Node 410B | | Node3 401C | |
| --- | --- | --- | --- | --- | --- |
| Rt Pref | Path Score | Rt Pref | Path Score | Rt Pref | Path Score |
| 200 | 3 | 190 | 3 | 180 | 3 |
| 150 | 2 | 140 | 2 | 130 | 2 |
| 100 | 1 | 90 | 1 | 80 | 1 |
| 50 | 0 | 40 | 0 | 30 | 0 |

SLA is expressed in terms of RTT, Jitter, and Packet Loss. The path score of a WAN-side overlay is expressed in terms of satisfying SLA metrics such as RTT, Jitter, Packet loss. If an overlay path satisfies all three requirements of the SLA, then the path score of the link is 3. If none of the three requirements of the SLA are satisfied, then the path score is 0.

Based on the path score of the WAN links of HA nodes 410, the corresponding route priority value is assigned and exported to the LAN Node (CE 11). Therefore, node 410A, which has highest priority, receives network traffic from LAN node destined to router 8.

If and when the path score for a WAN-side overlay of an HA node 410 decreases (such as where the link quality degrades such that the link no longer adheres to the SLA requirements), the corresponding node 410 updates the route preference and pushes the updated route, including the new preference, to CE 11. CE 11 may thereafter switch the forwarding of traffic to a different, more preferred node 410. As depicted in the example of FIG. 4A, based on SLA adherence measured for Nodes 410, CE 11 steers traffic toward Node 410A.

As depicted in the example of FIG. 4A, the routes are pushed to CE 11 from the corresponding HA nodes 410 over dynamic routing protocol. While exporting the route over the routing protocol, HA nodes 410 set the route preferences. Hence CE 11 receives the same routes from multiple HA nodes 410 with different respective route preferences. Based on the highest route preference, CE 11 steers traffic to the corresponding HA node 410. The route preference from the HA node 410 is programmed based on the adherence of a link to an SLA measured with router 8 (the WAN node). In some examples, each HA node 410 supports a single link to router 8. In other examples, each HA node 410 supports multiple links to router 8.

Because the HA node 410 updates this route preference directly and exports the route and route preference to CE 11, CE 11 eventually sends traffic to the specific node 410 having the highest route preference, in turn depends on (1) the most preferred node 410, and (2) the adherence of a respective WAN link of node 410 to SLA requirements.

When links 404 of each of respective nodes 410 satisfy the SLA requirements, CE 11 has a preferred Primary Node (node 410A in FIG. 1). Node 410A local preference is typically the highest preference (Depicted in FIG. 4A as having a default value of 200) so that CE 11 by default steers network traffic to node 410A. Node 410B has a second-highest preference (depicted in FIG. 4A as having a default value of 190), and node 410C has a third-highest preference (depicted in FIG. 4A as having a default value of 180), and so on.

In some examples, the local preference is statically set by an administrator based on SLA adherence. In other examples, system 400A may apply logic to assign a route preference to each node 410 dynamically based on SLA adherence.

In the example of FIG. 4A, while determining the path score for link 404A (corresponding to the score for node 410A), node 410A may internally set three local preferences, 150, 100 and 50, based on SLA path score, as depicted in the foregoing table. A path score of '3' means that Node 410A and WAN node link 404A satisfy the SLA requirements with respect to Jitter, RTT and packet-loss. The default preference for a path score of '3' for node 410A is 200. A path score of '2' means that Node 410A and WAN node link 404A do not satisfy (e.g., violate) the SLA requirements with respect to jitter, and the path score of node 410A is set to 150. A path score of '1' means that Node 410A and WAN node link 404A do not satisfy (e.g., violate) the SLA requirements with respect to jitter and RTT, and the path score of node 410A is set to 100. A path score of '0' means that Node 410A and WAN node link 404A do not satisfy (e.g., violate) the SLA requirements with respect to Jitter, RTT, and packet loss, and the path score of node 410A is set to 50.

While determining the path score for link 404B (corresponding to the score for node 410B), node 410B may internally set three local preferences, 140, 90 and 40, based on SLA path score, as depicted in the foregoing table. A path score of '3' means that Node 410B and WAN node link 404B satisfy the SLA requirements with respect to Jitter, RTT and packet-loss. The default preference for a path score of '3' for node 410A is 190. A path score of '2' means that Node 410B and WAN node link 404B do not satisfy (e.g., violate) the SLA requirements with respect to jitter, and the path score of node 410B is set to 140. A path score of '1' means that Node 410B and WAN node link 404B do not satisfy (e.g., violate) the SLA requirements with respect to jitter and RTT, and the path score of node 410B is set to 90. A path score of '0' means that Node 410B and WAN node link 404B do not satisfy (e.g., violate) the SLA requirements with respect to Jitter, RTT, and packet loss, and the path score of node 410B is set to 40.

While determining the path score for link 404C (corresponding to the score for node 410C), node 410C may internally set three local preferences, 130, 80 and 30, based on SLA path score, as depicted in the foregoing table. A path score of '3' means that Node 410C and WAN node link 404C satisfy the SLA requirements with respect to Jitter, RTT and packet-loss. The default preference for a path score of '3' for node 410C is 180. A path score of '2' means that Node 410C and WAN node link 404C do not satisfy (e.g., violate) the SLA requirements with respect to jitter, and the path score of node 410C is set to 130. A path score of '1' means that Node 410C and WAN node link 404C do not satisfy (e.g., violate) the SLA requirements with respect to jitter and RTT, and the path score of node 410C is set to 80. A path score of '0' means that Node 410C and WAN node link 404C do not satisfy (e.g., violate) the SLA requirements with respect to Jitter, RTT, and packet loss, and the path score of node 410C is set to 30.

In some examples, the performance of a link 404 has degraded such that its priority has been reduced as described above, but subsequently, the performance of the link may recover. Once the link 404 recovers and performance values meet the required SLA parameters, the original route preferences are restored, causing CE 11 to switch traffic back to original node 410A. The same logic can be used for multiple applications to distribute traffic uniformly across multiple MNHA nodes 410. In this way, one may achieve traffic load-balancing across multiple nodes 410. Individual nodes 410 may control multiple applications based on the configuration.

Figure 4B:
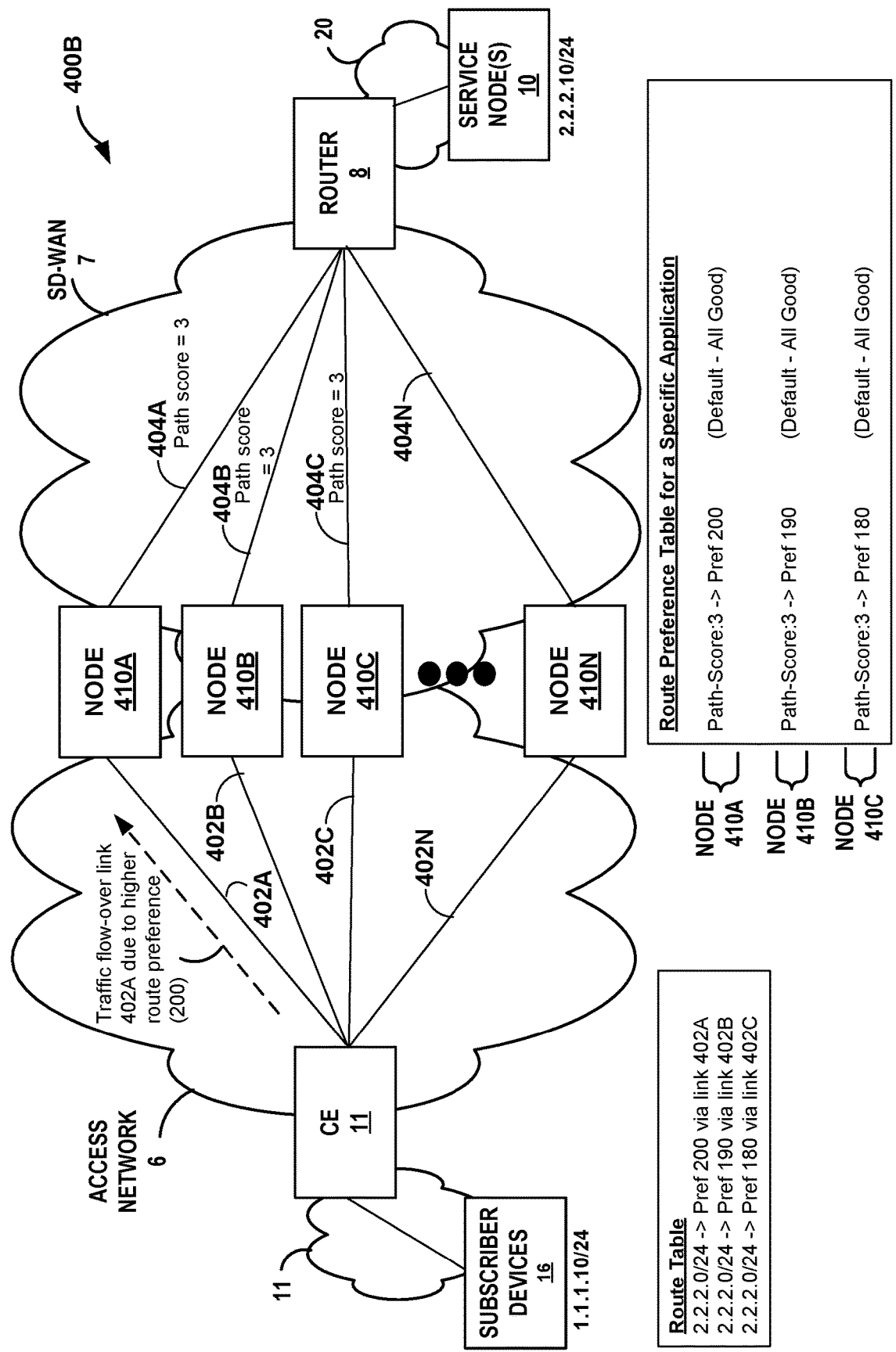

FIG. 4B is a block diagram illustrating example system 400B implementing MNHA for SD-WAN 7, in accordance with one or more techniques of this disclosure. The elements of FIG. 4B are similar to the like elements of FIG. 4A. The example of FIG. 4B depicts a deployment scenario in which all the links 404 across all the nodes 410 satisfy SLA requirements such that nodes 410 have a default path score of '3'.

With respect to the example of FIG. 4B, there may be a scenario where each WAN link 404 of nodes 410 adhere to SLA requirements. In this example, each of nodes 410 has a path score of '3'. In this example, CE 11 steers traffic to the node 410 associated with the highest preference route.

Table 2 depicts route preferences for each of nodes 410 where each WAN link 404 of nodes 410 adhere to SLA requirements:

TABLE 2

Route preference table where each node 410 adheres to SLA requirements.

| N1 | | N2 | | N3 | |
|---|---|---|---|---|---|
| Rt Pref | Path Score | Rt Pref | Path Score | Rt Pref | Path Score |
| 200 | 3 | 190 | 3 | 180 | 3 |

CE 11 receives three copies of routes to destination 2.2.2.0/24 with respective route preferences '200', '190', and '180'. Based on the route advertised by node 410A having the highest route preference, CE 11 steers traffic to node 410A.

Figure 4C:
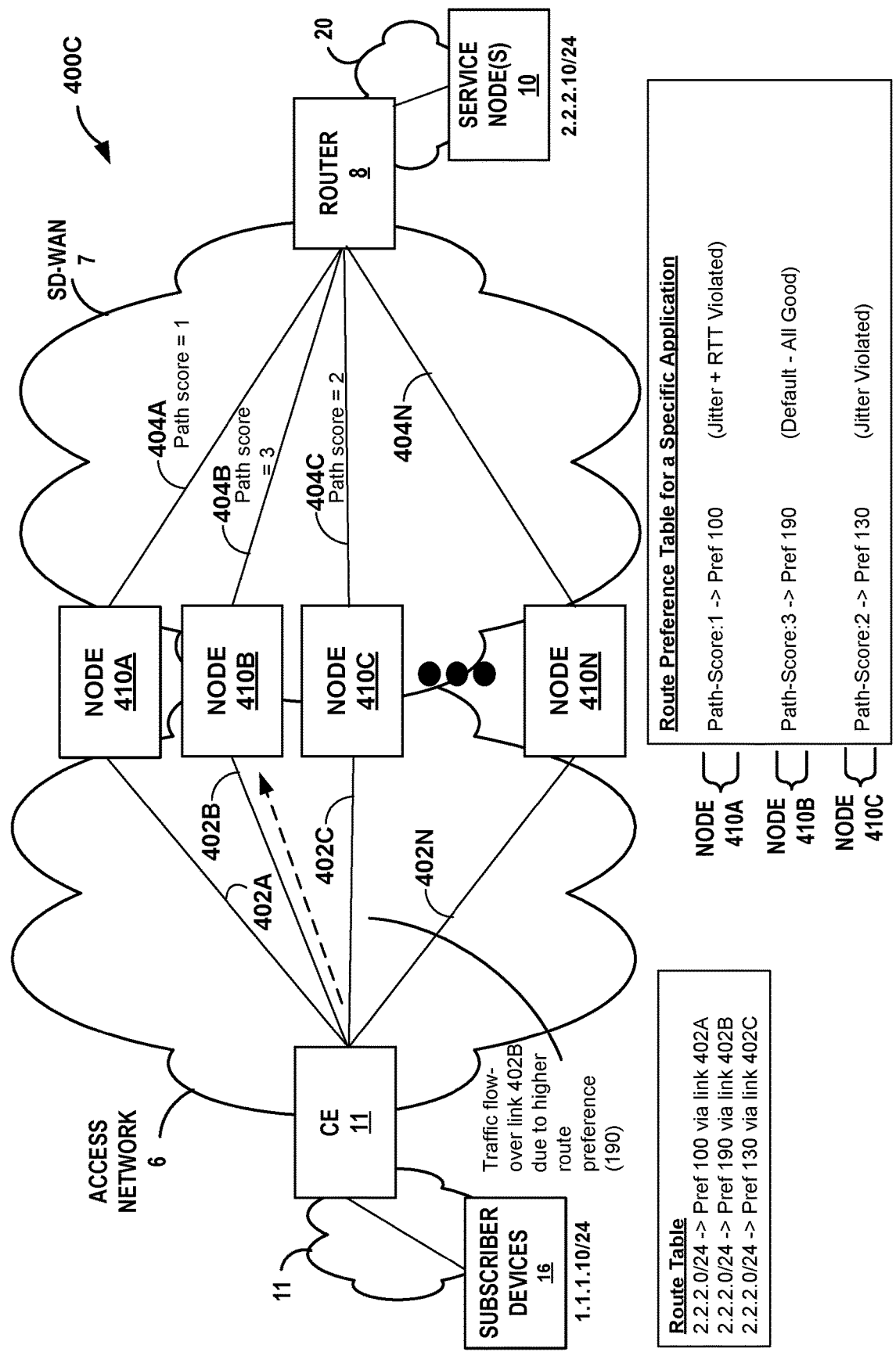

FIG. 4C is a block diagram illustrating example system 400C implementing MNHA for an SD-WAN, in accordance with one or more techniques of this disclosure. The elements of FIG. 4C are similar to the like elements of FIG. 4A. The example of FIG. 4C depicts a deployment scenario in which all the links 404 across all the nodes 410 have different path scores.

With respect to the example of FIG. 4C, there may be a scenario in which performance measurements for link 404A violate SLA requirements for Jitter and RTT, performance measurements for link 404B adhere to all of the SLA requirements, and performance measurements for link 404C violate SLA requirements for only Jitter. CE 11 steers traffic to the route having the highest path score. In this example, the path score of node 410A is '1', the path score of node 410B is '3', and the path score of node 410C is '2'.

Table 3 depicts route preferences for each of nodes 410 in the foregoing example:

TABLE 3

Route preference table where links 404 have varying levels of adherence to SLA requirements.

| N1 | | N2 | | N3 | |
|---|---|---|---|---|---|
| Rt Pref | Path Score | Rt Pref | Path Score | Rt Pref | Path Score |
| 100 | 1 | 190 | 3 | 130 | 2 |

CE 11 receives three copies of routes to destination 2.2.2.0/24 with respective route preferences '100', '190', and '130'. Based on the route advertised by node 410B having the highest route preference, CE 11 steers traffic to node 410B.

In some examples, after the performance of the links 402 degrade and the priority for the respective links 402 is reduced, the performance of the links 402 may improve. For example, with respect to the example of FIG. 4C, once link 404A, for example, recovers such that the performance measurements of link 404 adhere to the SLA requirements, node 410A adjusts the route preference accordingly and advertises an updated route including data specifying an updated route preference to CE 11. In response, CE 11 switches from forwarding of traffic to node 410B back to forwarding of traffic to the priority node 410A based on the updated preference.

Figure 4D:
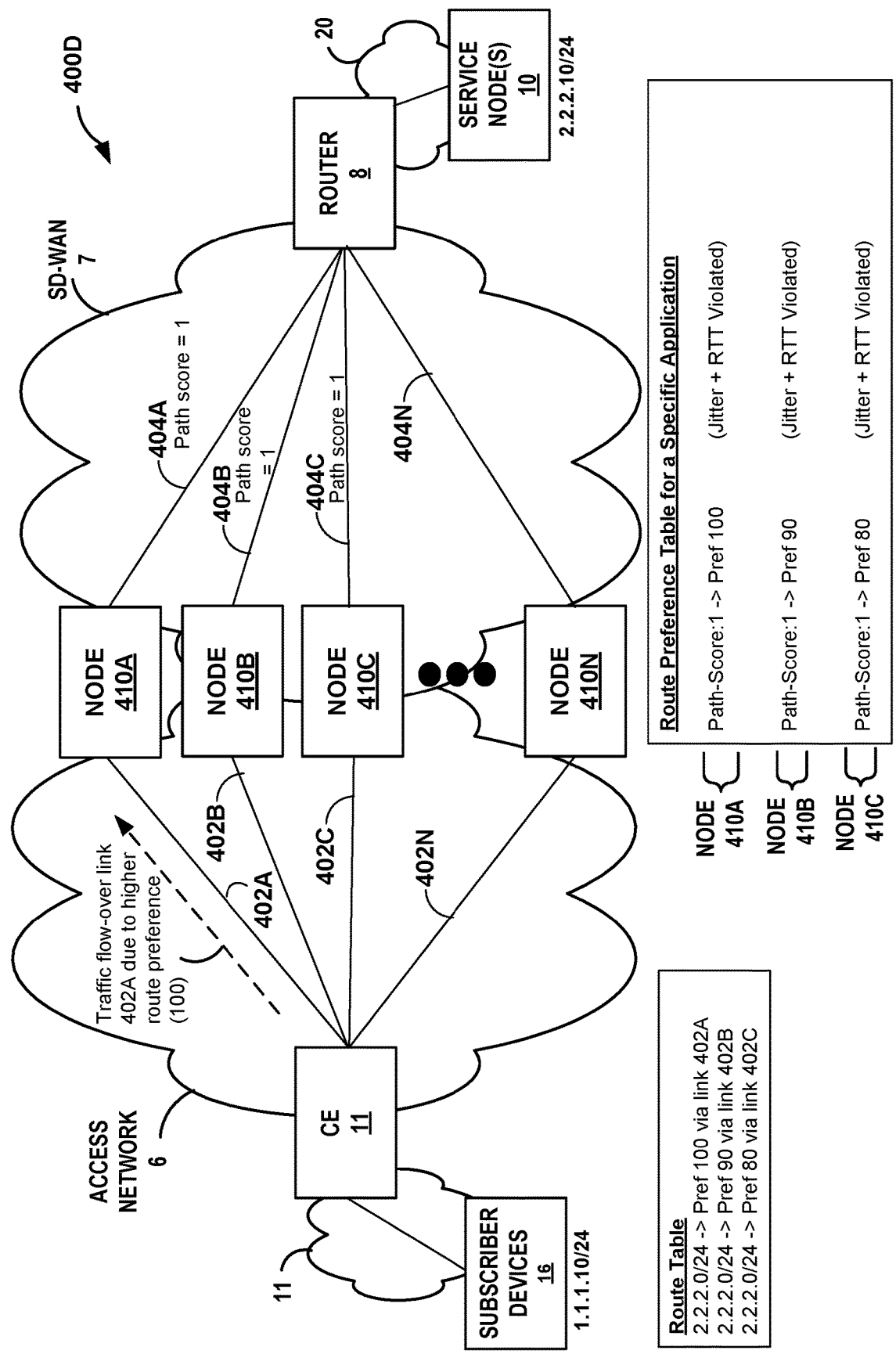

FIG. 4D is a block diagram illustrating example system 400D implementing MNHA for an SD-WAN, in accordance with one or more techniques of this disclosure. The elements of FIG. 4D are similar to the like elements of FIG. 4A. The example of FIG. 4D depicts a deployment scenario in which all the links 404 across all the nodes 410 are violated such that the nodes have a path score of '1'.

With respect to the example of FIG. 4D, there may be a scenario where each of WAN links 404 violate SLA requirements for jitter and RTT. In this example, each of nodes 410 has a path score of '1'. In this example, CE 11 steers traffic to the node 410 having the highest preferred route.

Table 4 depicts route preferences for each of nodes 410 in the foregoing example:

TABLE 4

Route preference table where all links 404 violate the SLA requirements.

| N1 | | N2 | | N3 | |
|---|---|---|---|---|---|
| Rt Pref | Path Score | Rt Pref | Path Score | Rt Pref | Path Score |
| 100 | 1 | 90 | 1 | 80 | 1 |

CE 11 receives three copies of routes to destination 2.2.2.0/24 with respective route preferences '100', '90', and '80'. Based on the route advertised by node 410A having the highest route preference, CE 11 steers traffic to node 410A.

The techniques of the disclosure may be extended based on specific solution requirements. For example, a route priority can also be expressed in terms of number of overlay paths satisfying the SLA requirements. A route priority can also be expressed based on a specific Layer-7 (L7) application. A route priority can also be expressed based on a WAN link level. Further, a route priority can be dynamically set.

The techniques of the disclosure may provide numerous advantages over conventional use of MNHA to implement an SD-WAN. For example, a system as described herein may use monitoring services to provide SLA requirements as an input to routing infrastructure. Furthermore, a system as described herein may enable routing decisions to be made based on performance measurements and/or SLA adherence measured via any monitoring services. In addition, the techniques of the disclosure may be implemented use any generic monitoring service able to measuring SLA requirements, such as TWAMP or RPM. Once performance measurements are measured and/or SLA adherence is determined for an HA node, a system as described herein may dynamically program the route preference. With a change in path score, a node may automatically change a route preference. In addition, the techniques of the disclosure enable an HA node to control the exporting of a route with a specific route preference based at least in part on SLA adherence of a WAN link. Furthermore, the techniques of the disclosure may enable an SD-WAN appliance on the LAN-side to steer network traffic to an HA node that is most suitable for meeting corresponding SLA requirements for an application associated with the traffic.

Furthermore, in a conventional MNHA configuration where the number of nodes may be unlimited, an SD-WAN may be unable to perform best path selection because it may be infeasible for every node to synchronize SLA DB state, probes, etc. This may be further complicated in a conventional MNHA configuration where HA nodes can sit in different geographical locations. The techniques of the disclosure enable a system to implement MNHA within an SD-WAN, regardless of the number of nodes or the geographical location of the nodes, because there is no need to synchronize any SLA DB state across the nodes.

Additionally, the techniques of the disclosure may enable existing features, such as route priority, to be dynamically programmed based on a current condition of a health of a WAN link of an HA node. Furthermore, the techniques of the disclosure may be enhanced for book-ended monitoring services to measure SLA adherence, such as Application Quality of Experience (AppQOE).

Additionally, conventional infrastructure may use monitoring services to feed routing. Network devices may support Realtime Probe Monitoring (RPM), which provide inputs to IP-Monitoring services to take certain actions. For example, IP-Monitoring services may support (1) injecting static route, (2) changing a preference of a static route, or (3) link enabling and disabling, etc. The techniques of the disclosure may enhance these IP-monitoring actions to support dynamic routing, as well as enhance the IP-monitoring services action list to program route preference for the dynamic routing protocol.

Figure 5:
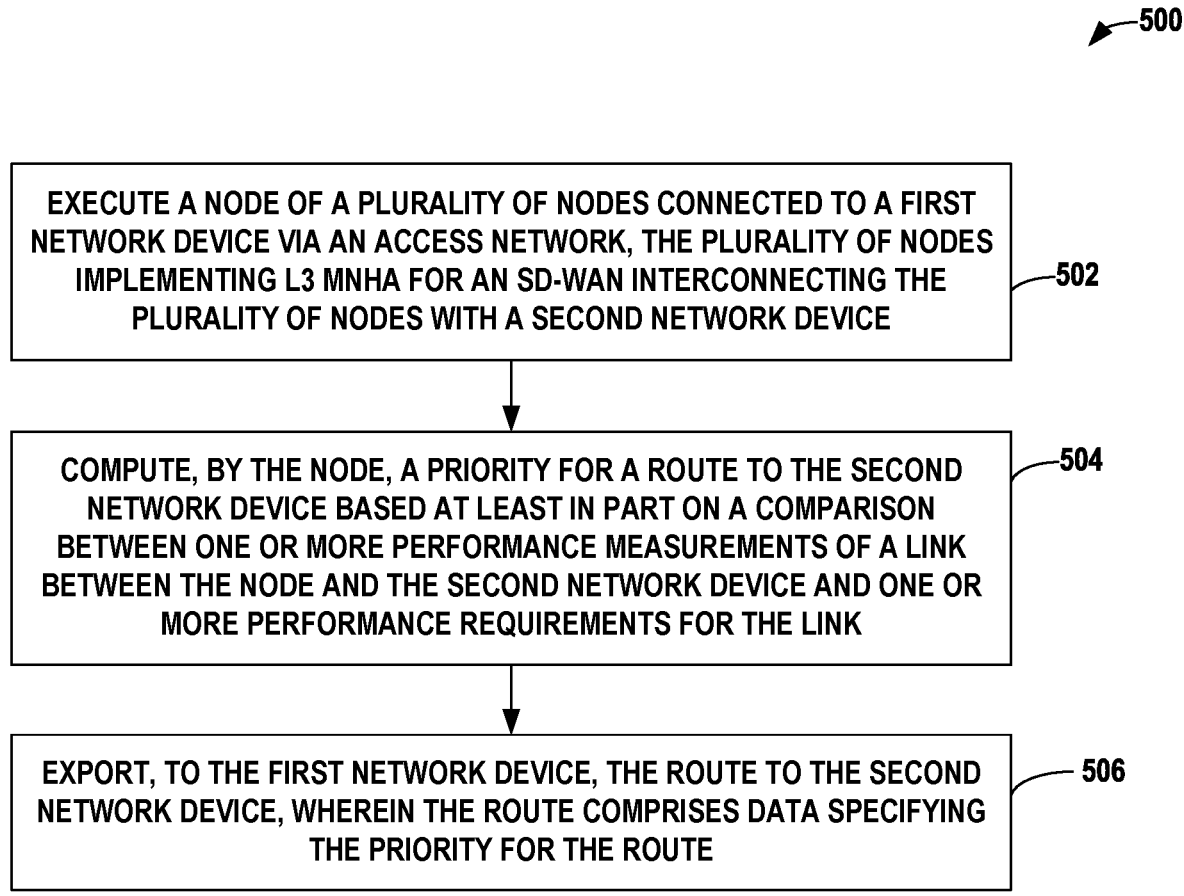
FIG. 5 is a flow chart illustrating an example operation in accordance with one or more techniques of this disclosure.

FIG. 5 is a flow chart illustrating an example operation 500 in accordance with one or more techniques of this disclosure. FIG. 5 is described with respect to SD-WAN appliance 300 of FIG. 3. However, the operation of FIG. 5 may also be performed by SD-WAN appliances 18 of FIG. 1 or SD-WAN appliance 218 of FIG. 2.

In accordance with the techniques of the disclosure, routing process 328 of SD-WAN appliance 300 executes a node of a plurality of nodes implementing MNHA for SD-WAN 207 of FIG. 2, which interconnects a first network device (e.g., CE 211) and a second network device (e.g., SD-WAN appliance 228) (502).

Route priority calculator 380 of routing process 328 computes a priority of a route from the node to the second network device, e.g., SD-WAN appliance 228, based at least in part on a comparison between one or more performance measurement of link 40 and one or more performance requirements for link 40 (504). For example, route priority calculator 380 obtains one or more performance measurements for link 40 between SD-WAN appliance 300 and, e.g., SD-WAN appliance 228 of FIG. 2. In some examples, the performance measurements include one or more of jitter, RTT, latency, or packet loss for WAN link 40. Further, route priority calculator 380 obtains one or more performance requirements for WAN link 40. In some examples, the one or more performance requirements for WAN link 40 comprise one or more SLA requirements. The SLA requirements may specify requirements for one or more of jitter, RTT, latency, or packet loss for WAN link 40. Route priority calculator 380 compares the one or more performance measurements of link 40 with the one or more performance requirements for link 40.

Route priority calculator 380 computes, based at least in part on the comparison, a priority of a route to the second network device, e.g., SD-WAN appliance 228, via link 40. Optionally, route priority calculator 380 further bases the computed priority for the route at least in part on a preference for the node as compared to others of the plurality of nodes implementing MNHA for SD-WAN 207. Routing process 328 exports, to the first network device, e.g., CE 211 of FIG. 2, the route to SD-WAN appliance 228 via link 40 (506). The route comprises data specifying the computed priority for the route.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising processing circuitry having access to memory, the processing circuitry configured to:

execute a node of a plurality of nodes connected to a first network device via an access network, the plurality of nodes implementing Layer-3 (L3) Multi-Node High Availability (MNHA) for a Software-Defined Wide Area Network (SD-WAN) interconnecting the plurality of nodes with a second network device, wherein the first network device and second network device comprise edge devices for a Layer-2 (L2) network, and wherein to implement L3 MNHA, the node is configured to synchronize state with other nodes of the plurality of nodes via one or more inter-chassis links (ICLs) interconnecting the plurality of nodes, wherein, to execute the node, the processing circuitry is configured to:

compute a priority value for a route to the second network device based at least in part on: (a) a comparison between one or more performance measurements of a link between the node and the second network device and one or more performance requirements for the link; and (b) a preference value, that is assigned to the node for forwarding network traffic to the second network device, relative to preference values that are assigned to other nodes of the plurality of nodes for forwarding network traffic to the second network device; and provide, to the first network device, the route to the second network device, wherein the route comprises data specifying the priority value for the route.

2. The computing system of claim 1, wherein, to compute the priority value for the route to the second network device, the processing circuitry is configured to:

compute a first priority value for the route based at least in part on a determination that the one or more performance measurements of the link satisfy the one or more performance requirements for the link, wherein the first priority value indicates that the route is more preferred than other routes to the second network device provided by other nodes of the plurality of nodes; or compute a second priority value for the route based at least in part on a determination that the one or more performance measurements of the link do not satisfy the one or more performance requirements for the link, wherein the second priority value indicates that the route is less preferred than the other routes to the second network device provided by the other nodes of the plurality of nodes.

3. The computing system of claim 1, wherein the processing circuitry is further configured to obtain the one or more performance measurements of the link between the node and the second network device.

4. The computing system of claim 1, wherein the one or more performance measurements of the link comprise measurements of one or more of: jitter, latency, round trip time (RTT), or packet loss of the link.

5. The computing system of claim 1, wherein the one or more performance requirements for the link comprise one or more Service-level Agreement (SLA) requirements for one or more of: jitter, latency, round trip time (RTT), or packet loss of the link.

6. The computing system of claim 1,
wherein the one or more performance measurements of the link comprise a plurality of performance measurements of the link, and
wherein the one or more performance requirements for the link comprise a plurality of performance requirements for the link.

7. The computing system of claim 6, wherein, to compute the priority value for the route to the second network device, the processing circuitry is configured to compute the priority value for the route based at least in part on a number of the plurality of performance measurements of the link that satisfy corresponding ones of the plurality of performance requirements for the link.

8. The computing system of claim 1, wherein the processing circuitry is configured to compute the priority value for the route and provide the route in response to a failure of a link of a plurality of links, wherein each link of the plurality of links is between a respective node of the plurality of nodes and the second network device.

9. The computing system of claim 1, wherein the processing circuitry is configured to compute the priority value for the route and provide the route in response to a load balancing operation to load balance network traffic from the first network device to the second network device.

10. The computing system of claim 1,
wherein the one or more performance requirements for the link comprise one or more first performance requirements for the link with respect to a first application and one or more second performance requirements for the link with respect to a second application, and wherein, to compute the priority value for the route to the second network device, the processing circuitry is configured to:

compute a first priority value for the route based at least in part on a determination that the one or more performance measurements of the link satisfy the one or more first performance requirements for the link with respect to the first application, wherein the first priority value indicates that the route is more preferred than other routes to the second network device provided by other nodes of the plurality of nodes for network traffic associated with the first application; and compute a second priority value for the route based at least in part on a determination that the one or more performance measurements of the link do not satisfy the one or more second performance requirements for the link with respect to the second application, wherein the second priority value indicates that the route is less preferred than the other routes to the second network device provided by the other nodes of the plurality of nodes for network traffic associated with the second application; and wherein, to export the route, the node is configured to:
provide, to the first network device, a first route to the second network device, wherein the first route comprises data specifying the first priority value for the first route with respect to network traffic associated with the first application; and provide, to the first network device, a second route to the second network device, wherein the second route comprises data specifying the second priority value for the second route with respect to network traffic associated with the second application.

11. A method comprising:
computing, by processing circuitry configured to execute a node of a plurality of nodes connected to a first network device via an access network, the plurality of nodes implementing Layer-3 (L3) Multi-Node High Availability (MNHA) for a Software-Defined Wide Area Network (SD-WAN) interconnecting the plurality of nodes with a second network device, a priority value for a route to the second network device based at least in part on: (a) a comparison between one or more performance measurements of a link between the node and the second network device and one or more performance requirements for the link; and (b) a preference value, that is assigned to the node for forwarding network traffic to the second network device, relative to preference values that are assigned to other nodes of the plurality of nodes for forwarding network traffic to the second network device, wherein the first network device and second network device comprise edge devices for a Layer-2 (L2) network, and wherein to implement L3 MNHA, the node is configured to synchronize state with other nodes of the plurality of nodes via one or more inter-chassis links (ICLs) interconnecting the plurality of nodes; and providing, by the processing circuitry and to the first network device, the route to the second network device, wherein the route comprises data specifying the priority value for the route.

12. The method of claim 11, wherein computing the priority value for the route to the second network device comprises:

computing a first priority value for the route based at least in part on a determination that the one or more performance measurements of the link satisfy the one or more performance requirements for the link, wherein the first priority value indicates that the route is more preferred than other routes to the second network device provided by other nodes of the plurality of nodes; or computing a second priority value for the route based at least in part on a determination that the one or more performance measurements of the link do not satisfy the one or more performance requirements for the link, wherein the second priority value indicates the route is less preferred than the other routes to the second network device provided by the other nodes of the plurality of nodes.

13. The method of claim 11, wherein the one or more performance measurements of the link comprise measurements of one or more of: jitter, latency, round trip time (RTT), or packet loss of the link.

14. The method of claim 11, wherein the one or more performance requirements for the link comprise one or more Service-level Agreement (SLA) requirements for one or more of: jitter, latency, round trip time (RTT), or packet loss of the link.

15. The method of claim 11, wherein the one or more performance measurements of the link comprise a plurality of performance measurements of the link, wherein the one or more performance requirements for the link comprise a plurality of performance requirements for the link, and wherein, computing the priority value for the route to the second network device comprises:

computing the priority value for the route based at least in part on a number of the plurality of performance measurements of the link that satisfy corresponding ones of the plurality of performance requirements for the link.

16. The method of claim 11, wherein computing the priority value for the route and providing the route is in response to a failure of a link of a plurality of links, wherein each link of the plurality of links is between a respective node of the plurality of nodes and the second network device.

17. The method of claim 11, wherein computing the priority value for the route and providing the route is in response to a load balancing operation to load balance network traffic from the first network device to the second network device.

18. Non-transitory, computer-readable media comprising instructions, that, when executed, are configured to cause processing circuitry of a computing system to:

execute a node of a plurality of nodes connected to a first network device via an access network, the plurality of nodes implementing Layer-3 (L3) Multi-Node High Availability (MNHA) for a Software-Defined Wide Area Network (SD-WAN) interconnecting the plurality of nodes with a second network device, wherein the first network device and second network device comprise edge devices for a Layer-2 (L2) network, and wherein to implement L3 MNHA, the node is configured to synchronize state with other nodes of the plurality of nodes via one or more inter-chassis links (ICLs) interconnecting the plurality of nodes, wherein, to execute the node, the processing circuitry is configured to:

compute a priority value for a route to the second network device based at least in part on: (a) a comparison between one or more performance measurements of a link that is between the node and the second network device and one or more performance requirements for the link and (b) a preference value, that is assigned to the node for forwarding network traffic to the second network device, relative to preference values that are assigned to other nodes of the plurality of nodes for forwarding network traffic to the second network device; and provide, to the first network device, the route to the second network device, wherein the route comprises data specifying the priority value for the route.

* * * * *